Dec. 11, 1923.
E. M. SISLEY
1,477,290
DEMOUNTABLE RIM
Filed June 8, 1922
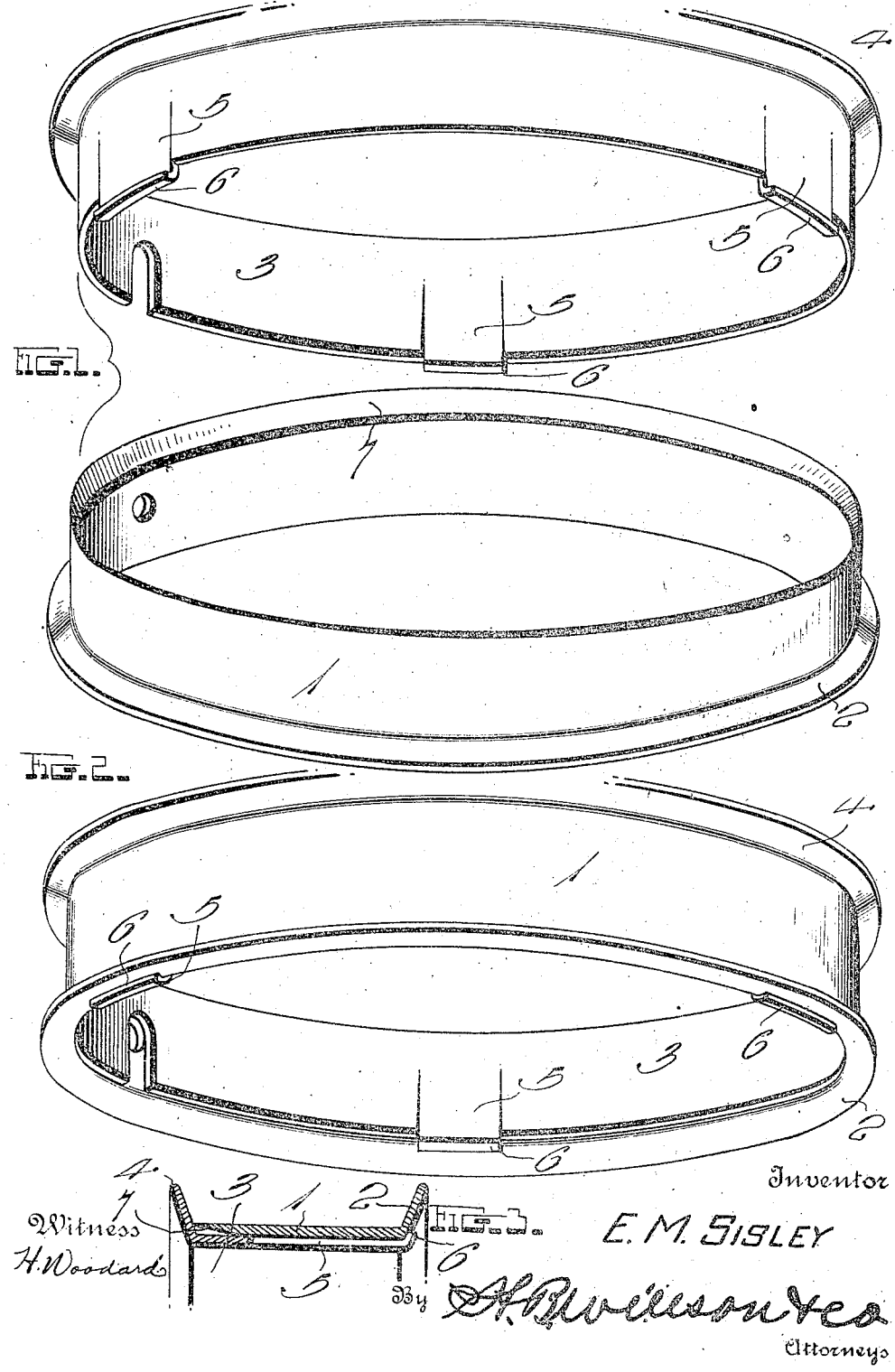

Patented Dec. 11, 1923.

1,477,290

UNITED STATES PATENT OFFICE.

EUGENE M. SISLEY, OF HUNTINGTON, OREGON.

DEMOUNTABLE RIM.

Application filed June 8, 1922. Serial No. 566,833.

*To all whom it may concern:*

Be it known that I, EUGENE M. SISLEY, a citizen of the United States, residing at Huntington, in the county of Baker and State of Oregon, have invented certain new and useful Improvements in Demountable Rims; and I do declare the following to be a full, clear, and exact description of the invention, such as will enable others skilled in the art to which it appertains to make and use the same.

My invention relates to improvements in automobile rims and more particularly to those of the demountable type and of sectional construction, so as to facilitate engagement with and disengagement from the tire, the object of the invention being to provide an extremely simple and inexpensive, yet a highly efficient and desirable rim structure which will effectively hold the tire when the rim sections are secured together, yet will permit easy changing of tires whenever necessary.

With the foregoing in view, the invention resides in the novel subject matter hereinafter described and claimed, the description being supplemented by the accompanying drawings.

Figure 1 is a perspective view showing the two sections of the rim in juxtaposition.

Figure 2 is a perspective view of the rim complete.

Figure 3 is a detail transverse sectional view through the complete rim.

In the drawings above briefly described, the numeral 1 designates an outer continuous rim section having a bead-engaging flange 2 on one edge while its other edge is free. Adapted to fit removably within the rim section 1, is an inner rim section 3 having a bead-engaging flange 4 on one edge which co-operates with the flange 2 in holding the tire upon the rim. To secure the two rim sections 1 and 3 detachably together, I provide the inner section 3 with a plurality of spring tongues 5 whose free ends are positioned at the unflanged edge of the section 3 to engage the flanged edge of the section 1. These tongues are preferably formed by transversely splitting the rim section 3 on preferably parallel lines as indicated in Figure 1, and in most instances I prefer to extend the tongues slightly beyond the free edge of the rim section and bend their free ends outwardly as indicated at 6 to hook around the flanged edge of the outer section 1. For the purpose of retracting the tongues 5 when the two rim sections are forced into operative relation with each other, I prefer to internally bevel the outer section 1 as shown at 7. It will thus be seen that when the rim sections are moved into engagement with each other with the projecting ends 6 of the tongues 5 engaging the bevel 7, simple forcing of the inner section 3 into the outer section 1 will retract the tongues until the two rim sections have been completely telescoped. When this occurs, the tongues spring out under their own resiliency and interlock with the outer rim section 1 as shown clearly in Figs. 2 and 3.

With the two rim sections disconnected as shown in Fig. 1, the outer section 1 is laid upon a garage floor or the like and the tire is slipped over the same. Then, it is simply necessary to start the rim section 3 into the section 1 by hand and then force it completely in place, for instance by foot pressure. It is thus a much easier task to apply the tire, than when rims of the ordinary forms are used.

Since excellent results may be obtained from the details disclosed, they are preferably followed, but within the scope of the invention as claimed, numerous minor changes may of course be made.

I claim:

1. An inner rim section having one free edge and a tire-engaging flange on its other edge, said rim section being provided with relatively close transverse splits opening through its free edge to form a spring tongue between each pair of splits, the portions of the rim sections forming the tongues being extended beyond the free edge of the rim section and the outer ends of the tongues being bent laterally outward to engage the outer face of a flange at the edge of an outer rim section into which the inner rim section telescopes.

2. A demountable rim comprising inner and outer continuous rim sections telescoping one within the other, the outer rim section having one edge portion provided with a circumferentially extending tire engaging flange and having its other edge portion provided with a bevel forming an inner cam face, the inner rim section having one edge portion provided with a tire engaging flange and cut transversely from its other edge to provide tongues between the cuts, said tongues having their free end portions bent to form hooks adapted to be sprung inwardly through engagement with the cam face of the outer rim section when the rim sections are first placed in telescoping relation and moving into engagement with the outer face of the tire engaging flange of the outer rim section when the inner rim section is completely telescoped into the outer rim section.

In testimony whereof I have hereunto set my hand.

EUGENE M. SISLEY.